United States Patent [19]
Barton

[11] Patent Number: 6,101,604
[45] Date of Patent: Aug. 8, 2000

[54] METHOD AND APPARATUS FOR EMBEDDING AUTHENTICATION INFORMATION WITHIN DIGITAL DATA

[75] Inventor: James M. Barton, Los Gatos, Calif.

[73] Assignee: Sony Corporation, Japan

[21] Appl. No.: 09/320,318

[22] Filed: May 26, 1999

Related U.S. Application Data

[63] Continuation of application No. 09/193,452, Nov. 17, 1998, which is a continuation of application No. 08/824,174, Mar. 26, 1997, Pat. No. 5,912,972, which is a continuation of application No. 08/357,713, Dec. 14, 1994, Pat. No. 5,646,997.

[51] Int. Cl.[7] ..................................................... H04L 9/00
[52] U.S. Cl. .......................... 713/176; 380/200; 380/201; 380/217; 380/30; 380/54
[58] Field of Search ..................................... 380/200, 201, 380/203, 210, 255, 259, 277, 278, 283, 216, 217, 30, 54; 713/150, 164, 165, 167, 200, 201, 168, 176; 283/72, 73; 382/100, 162, 173, 181, 232, 276

[56] References Cited

U.S. PATENT DOCUMENTS

| | | |
|---|---|---|
| 4,433,207 | 2/1984 | Best . |
| 4,639,548 | 1/1987 | Oshima et al. . |
| 4,750,173 | 6/1988 | Blüthgen . |
| 4,943,973 | 7/1990 | Werner . |
| 4,969,041 | 11/1990 | O'Grady et al. . |
| 5,161,210 | 11/1992 | Druyvesteyn et al. . |
| 5,200,822 | 4/1993 | Bronfin et al. . |
| 5,243,423 | 9/1993 | DeJean et al. . |
| 5,319,735 | 6/1994 | Preuss et al. . |
| 5,327,237 | 7/1994 | Gerdes et al. . |
| 5,354,097 | 10/1994 | Tel ............................................. 283/72 |
| 5,387,941 | 2/1995 | Montgomery et al. . |
| 5,450,490 | 9/1995 | Jensen et al. . |
| 5,530,751 | 6/1996 | Morris . |
| 5,539,471 | 7/1996 | Myhrvold et al. . |
| 5,557,333 | 9/1996 | Jungo et al. . |
| 5,568,570 | 10/1996 | Rabbani . |
| 5,572,247 | 11/1996 | Montgomery et al. . |
| 5,574,962 | 11/1996 | Fardeau et al. . |
| 5,579,124 | 11/1996 | Aijala et al. . |
| 5,581,800 | 12/1996 | Fardeau et al. . |
| 5,587,743 | 12/1996 | Montgomery et al. . |
| 5,606,609 | 2/1997 | Houser et al. . |
| 5,636,995 | 6/1997 | Sharpe . |
| 5,671,277 | 9/1997 | Ikenoue et al. . |
| 5,719,939 | 2/1998 | Tel ........................................ 283/73 X |
| 5,721,788 | 2/1998 | Powell et al. . |
| 5,778,102 | 7/1998 | Sandford, II et al. . |

FOREIGN PATENT DOCUMENTS

| | | |
|---|---|---|
| 0 581 317 A2 | 2/1994 | European Pat. Off. . |
| 0 651 554 A1 | 5/1995 | European Pat. Off. . |
| 95/20291 | 7/1995 | WIPO . |

OTHER PUBLICATIONS

"NEC's 'watermark' tech aimed at Web" by George Leopold, No Date.
"[Argent] digital watermark system", 1995, Dice Corp.
[Image] Download MS Word Version, No date, no publisher.

*Primary Examiner*—Bernarr E. Gregory
*Attorney, Agent, or Firm*—Lerner, David, Littenberg, Krumholz & Mentlik, LLP

[57] ABSTRACT

Arbitrary digital information is embedded within a stream of digital data, in a way that avoids detection by a casual observer and that allows a user to determine whether the digital data have been modified from their intended form. The embedded information may only be extracted as authorized and may be used to verify that the original digital data stream has not been modified.

82 Claims, 3 Drawing Sheets

METHOD AND APPARATUS FOR EMBEDDING AUTHENTICATION INFORMATION WITHIN DIGITAL DATA

CROSS-REFERENCE TO RELATED APPLICATIONS

This application is a continuation of U.S. application Ser. No. 09/193,452, filed Nov. 17, 1998, which in turn is a continuation of U.S. application Ser. No. 08/824,174, filed Mar. 26, 1997, now U.S. Pat. No. 5,912,972, which in turn is a continuation of U.S. application Ser. No. 08/357,713, filed Dec. 14, 1994, now U.S. Pat. No. 5,646,997, dated Jul. 8, 1997.

BACKGROUND OF THE INVENTION

1. Technical Field

The invention relates to digital data, including digital audio, video, and image data. More particularly, the invention relates to a method and apparatus for embedding authentication data within such digital data in a way that avoids detection by a casual observer and that allows a user to determine whether the digital data have been modified from their intended form.

2. Description of the Prior Art

The number of applications that use digital storage and transmission techniques is increasing at a rapid rate. This technology currently has a broad range of uses, such as computer manipulation of audio, video and images; high-quality transmission of video over public networks (including cable and telephone networks); and permanent storage of archival data, including optically scanned text and images, such as letters and documentation.

Digital data may be modified such that it is not possible to detect whether the digital data have been modified, without use of extraordinary means. For example, a photograph may be digitized with high-resolution scanning equipment. Once digitized, the photograph may be modified with any of several different commercial computer programs, and the modified photograph may then be printed with a high-resolution photographic printer. It is impossible to detect tampering with the photographic image by examining the image itself.

Similarly, audio and video recordings are also vulnerable to such electronic tampering.

Consider another case: the expanding use of optically scanned images of documentation to maintain an electronic database of business and/or legal records. For example, many insurance companies are converting to all-electronic files. In fact, Federal government regulations now permit the destruction of paper documentation after conversion to an electronic format. Such scanned information is often of limited quality and of low resolution, making tampering a simple task.

The so-called information highway and other increasingly ubiquitous electronic distribution systems provide fertile grounds in which piracy and electronic tampering can flourish. For example, the Berne convention on copyrights gives an artist the right to maintain his work as a single, complete, and unmodified whole. Electronic tampering makes it difficult to ensure and police this property right.

The following definitions are provided for purposes of the discussion herein:

"Authentication" refers to techniques that are used to avoid the problem of electronic tampering and similar problems. The specific effects authentication addresses are:

Known Creator. It is important that to know with assurance that the object originated with the proper source. For example, that a movie came directly from the studio.

No Tampering. It is important to have assurance that the object has not been modified in some way. For example, it is necessary to know that the movie is the same one paid for, with all portions intact.

Authority to Possess. The receiver of the object should be able to prove that the object was properly obtained (e.g. by licensing or purchase).

Authenticity can be proven either by some feature of the object itself, or by an accompanying object which is known to be authentic. For example, a license to use a copy of a software product, usually a paper document, typically accompanies the disks containing the software. However, tampering with the object is not easily detected. The software on the disks may have been modified, or the license itself may have been altered or forged.

Practitioners in communications technologies use the terms "in-band" and "out-of-band" to refer to methods for embedding additional, disguised data within the communications channel. In-band information is information that is carried within the transmission format itself, while out-of-band information is information that is carried outside the communications channel, e.g. via a second channel. Thus, in-band refers to data encoding that is transparent to underlying transmission and storage systems, while out-of-band refers to data encoding that is visible to transmission and storage systems because it must be handled directly. Authentication information can be carried either in-band or out-of-band.

An example of out-of-band information relates to the signaling necessary to set up a phone call between telephone exchanges. This signaling is usually carried on various links that are separate from those links that carry the data for the phone connection.

Data overlaid in-band are referred to as embedded data. Various television transmission systems embed data in-band without changing the format or viewability of the television signal, for example when providing close-captioning, time codes for video editing, and low-speed data transmission channels for cable converter control and other uses.

Embedded data are sometimes stored in specific fields reserved within a digital data stream. The size and format of these fields does not usually provide sufficient space, security, or reliability to allow the transmission of sensitive data, such as authentication information. It is also desirable to avoid changes to existing formats, and to avoid committing portions of future formats to always carry certain fields. It is therefore preferred to allow the embedding of data within a data stream independently of the stream format, such that the both embedded data and the original data stream (if desired) can be recovered in a reliable and secure fashion.

Embedding additional data in a digital data stream requires modification of the original data stream. If it is desired to restore the original data stream, the portion of the original data stream that was modified during the embedding process must be replaced with the original data. Accordingly, the original data must be embedded in the data stream along with the additional data. If high level information about the data stream structure is available, it may be possible to embed the additional data with less intrusion, such that the additional data are undetectable to the casual observer.

The term "meta-data" refers to information about the data stream, such as file permission, file type, application type, serial number, creator identification, licensee identification, and other arbitrary attributes of the data stream. It is important that meta-data are copied and distributed in precise tandem with the copying and distribution of the data stream. Out-of-band systems carry this meta-data as either separate parcels of information, or by reformatting the data stream.

An example of meta-data involves copying a data stream between two computer systems. An out-of-band system first copies the meta-data to a suitable file, or stores the information in a relational database. Following this, the original digital data are copied and stored in a separate file. Because multiple files require a file management scheme, there is a significant likelihood that the data stored in one file do not match the corresponding data in other files. An in-band meta-data system only has a single file, representing both the data stream and information about the data stream, avoiding the foregoing problems associated with out-of-band systems.

One of the most important aspects of meta-data is their use for higher-level authentication purposes. Ideally, meta-data should be stored as an in-band component of the digital data stream, making the stream simpler to handle and administer. Thus, an out-of-band scheme is not well suited for this application for at least the following reasons: First, movement of security data must be explicitly handled by the underlying transmission or storage system, adding cost and complexity to the system. Second, separate transmission or storage of such security information provides opportunities for unauthorized capture of the information, and for aliasing, i.e. where the correct information is suppressed and modified data are provided instead. Third, there is a likelihood of generating errors due to lost or misplaced security data.

In those applications that provide data authentication, a digital data stream must be permanently marked with embedded meta-data, such as a serial number or other identifying information, without altering the underlying data format. This makes it possible to distribute copies of the original data that include indelible authentication information, such that later certification of the copies or detection of unauthorized copying is possible.

One industry in which there is a need for such embedded authentication is the graphics design industry, and in particular companies that provide high quality, stock photographic images in digital format for use in connection with sales collateral and advertisements. These companies typically charge a royalty for each use of a photographic image. While the use of electronic distribution for photographic images is very attractive, because of its potential to lower distribution and inventory costs significantly, the ability to produce an infinite number of perfect copies of such images is a big danger to this industry, because there would be little control over distribution. The ability to verify that each copy of a particular photograph is authorized would prevent loss of revenue due to unauthorized copying by allowing ready identification of such unauthorized copies. Accordingly, embedded authentication data can provide a way both to detect illegal copying and to prove ownership.

The meta-data embedding process must be secure, otherwise the embedded information can be modified by unauthorized persons in much the same way that the data stream can be modified. The integrity of the data stream may be secured on several levels, but the most powerful form of such security only occurs if it is possible to verify that the digital data stream being checked is exactly the same as the original data stream, i.e. that the digital data stream and the authentication information carried in the data stream match, indicating that they have not been tampered with.

For this purpose, it is necessary to calculate a compact representation of a digital image from which it is extremely difficult or impossible to reproduce the original. This representation is referred to as a digital signature. A suitable algorithm for calculating a digital signature generates a representation that is not reproducible except from the original data. Examples of digital signatures include a checksum, which is good for small blocks of data; a cyclic redundancy check (CRC), which provides a much better signature over larger blocks of data; and a fast Fourier transform (FFT), which produces a family of polynomials describing the frequencies in the digital block (essentially, the FFT transforms data described in the spatial domain to the frequency domain).

It would be a significant advance in the art of electronic distribution if digital information could be secured against unauthorized use or copying, for example by providing a tamper proof authentication scheme.

SUMMARY OF THE INVENTION

The invention provides a method and apparatus for basic authentication of a digital block and for carrying additional authentication information provided by the user, i.e. meta-data, in a secure and reliable fashion. To embed authentication data into a digital block, a digital signature is formed that is a reduced representation of the digital block. The signature and additional information supplied by the user are embedded into the digital block by replacing predetermined bits within the block. Encryption can be used to enhance authentication capability. The encrypted data can be further verified using error correction coding techniques. For sequential data, such as the frames of a video display, a sequence numbers can also be provided as part of the meta-data to ensure that frames have not been deleted or re-ordered.

During authentication the foregoing steps are reversed, such that authentication can be performed only by one having knowledge of the precise coding procedure. A dedicated logic device can be used to enhance the performance of the foregoing operations.

DETAILED DESCRIPTION OF THE INVENTION

Figure 1:
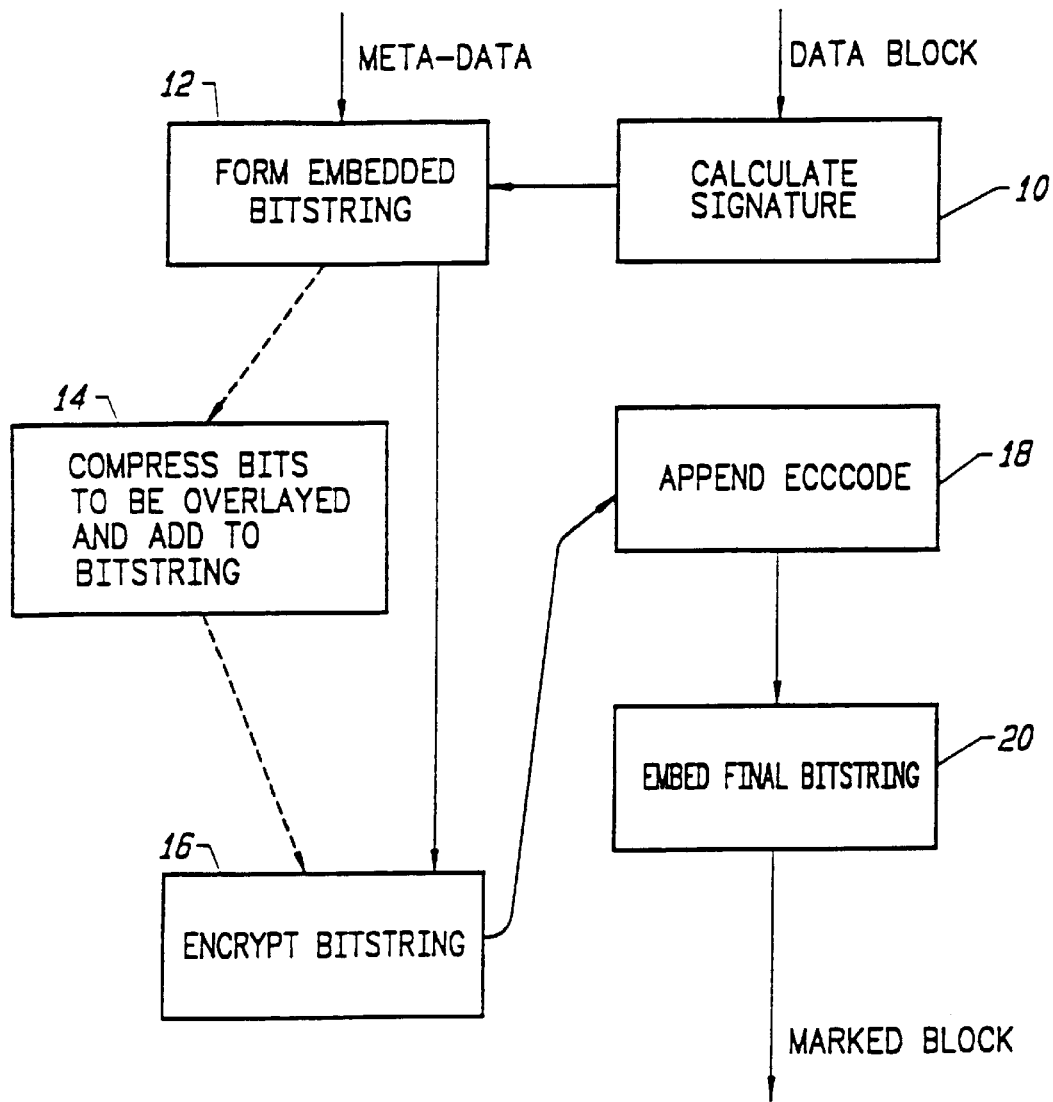
FIG. 1 is a flow diagram of an embedding sequence according to the invention.

The invention provides an authentication system for digital information in which data are embedded in a bit stream by modifying an original bit stream. Accordingly, precise reconstruction of the original bit stream requires the inclusion within the bit stream of an accurate record of the bits before modification. Furthermore, the original bit stream must be compressible using a reversible technique at a desired compression ratio to provide space within the bit stream for additional information. Alternatively, high-level knowledge of the lossiness of the data (i.e. the information contained in the format is a heavily compressed version of the original data, such that the original can only be partially reconstructed) permits the making of permanent, yet imperceptible, changes to the bit stream.

Transmission systems are rapidly being converted from analog data formats to digital data formats. The transition from analog to digital transmission necessitates the design of new formats for transmission and storage of the data. Appropriate examples are the Joint Photographic Experts Group ("JPEG") format for digital images, and the Motion Pictures Experts Group ("MPEG") format for continuous transmission of digitally encoded video data. Both of these formats are lossy, i.e. the information contained in the format is a heavily compressed version of the original data, such that the original can only be partially reconstructed; and both formats take advantage of the fact that human visual perception is insensitive to minor errors in the image, making even a heavily compressed image acceptable. These standards are readily adapted for use with the invention. Significantly, the invention exploits to advantage the fact that the addition of errors to the data, e.g. an image, by modifying the data results in substantially imperceptible changes to the data if the number of errors is small.

Certain non-lossy systems are also readily used in connection with the invention. As discussed above, analog television systems can carry additional in-band data. Often, these television images begin as digital video data streams. For instance, the Society of Motion Picture and Television Engineers ("SMPTE") 259M standard specifies a digital data stream format for television images that contains considerable information about each image. Many in-band data systems, such as time code, rely on the fact that certain parts of the video image bit stream are not displayed by most television equipment. Adding errors by modifying a small amount of the data stream does not affect the portion of the image that is presented on the display. In this sense, the video bit stream is lossy because a part of the bit steam may be changed without affecting the displayed image.

Although the invention relates to a reversible process that is useful for reproducing an original image, it is also useful for authenticating an image. This concept, often referred to as marking, is analogous to the serial numbers that are physically placed on most goods. Lossy data stream formats are ideal candidates for marking, both from a technical and an economic point of view.

An example of marking in the context of the invention herein involves the digital archiving of paper documents. By embedding the proper information in the digital image when the document is optically scanned, it is possible to detect tampering with the document. This allows safe destruction of the paper originals, thereby reducing storage and maintenance costs. Another use for the invention involves the handling of legal documents, for similar reasons as those stated above.

The successful implementation of the foregoing applications of the invention requires a system for checking the authenticity of documents in a reliable way. Thus, a secure method for distributing the information necessary to extract and check the authentication data must be provided. Furthermore, such authentication and tamper checking process must be available on demand when the authenticity of a document is in doubt. For example, by referring to an authentication bureau that maintains authentication information at a secure location, using the document and a particular authentication method, the bureau can return a simple yes/no authentication without revealing the key. Such a scheme has been proposed by the National Institute of Standards and Technology, but solely for proving a known creator or proper licensee, rather than for tamper-proofing.

The invention provides a method and apparatus for authenticating a block of digital data, such as a video image, a scanned image, or an audio signal. For the purposes of the discussion herein, these and other similar blocks or streams of digital data are referred to as a digital block. The invention provides an authentication stamp that is embedded into a digital block that contains a digital object. The authentication stamp modifies the data comprising the digital block. However, the authentication stamp does not change the basic format of the digital object. In most cases, the authentication stamp is obscured relative to the magnitude of the remaining data. The authentication stamp may include additional data supplied by the user, referred to as meta-data, that are carried in a secure and reliable fashion and that may be retrieved from the digital data block as needed.

In some applications of the invention, the digital data block may be restored to its original state if and only if it is authenticated. The authentication methods are typically as secure as the encryption key distribution scheme and can accommodate minor transcription errors. The encoding and authentication steps are readily implemented in integrated digital electronic hardware for dedicated applications, such as cameras, video recorders, and cable converters.

Thus, the invention provides an encoding method that embeds the authentication stamp in the digital block and a decoding method that retrieves the meta-data from an authenticated digital block, and allows restoration of the original data block, if desired. Both the embedding and retrieval functions operate upon blocks of data within a data stream. The selection of the size of this block may either be independent of the data stream format, or it may in some way take advantage of the underlying format. Practitioners in the art will recognize that the block size chosen must satisfy a number of design goals at the same time, including:

Efficiency: A larger block size usually allows more efficient handling of the data by either software or hardware. However, larger blocks may require large amounts of memory or other circuitry, thereby raising hardware cost.

Uniqueness: The block size must be chosen to match the digital signature technique, or vice-versa. The goal is to achieve as unique a signature as possible, within the bounds of cost and efficiency. For instance, a 16-bit checksum is appropriate for very small blocks (e.g. a few tens of bytes) and is also very quickly calculated, while a Fourier transform is appropriate for very large blocks, but takes a great amount of time to calculate.

Numbering: It is often desirable to give each digital data block in a continuous data stream a unique serial number as part of the meta-data. This provides an additional level of tamper proofing, because re-ordering, addition, or deletion of blocks, as well as modification of an individual block are readily detected. By matching the block size to a natural size within the format of the underlying data stream, such numbering is a very powerful authentication method.

Embedding Process

The embedding process is shown in FIG. 1. A control process invokes the embedding process on an appropriate data block. For each data block, the control process presents a data block and an additional bit string that may contain meta-data that is to be embedded along with the basic authentication information. The meta-data may be a block sequence number, and it may also include other meta-data, such as a bit string that identifies the creator of the block or the licensing agent. The embedding process modifies the data block in place to contain the embedded information.

The steps of the embedding process are:
1. Calculate a digital signature for the block (10). The bits modified by the embedding process in the digital signature calculation are not included because they will change. This is easily done by assuming that those modified bits were all zero or all one for the purposes of the computation.
2. Append the signature to the meta-data bit string (12). If desired, append to the bit string to be embedded. After appending the digital signature, a field indicating the signature calculation technique is used. For more secure applications, this last step should not be done.
3. Compress the original bits and append them to the bit string (14). This step is optional, and only possible if the extracted bits can be compressed at some useful ratio. For example, if 2048 bits in the original image are to be overlaid to carry the embedded data, then a 2:1 compression ratio achieved using Lempel-Ziv compression would provide adequate space to carry the compressed data (1024 bits) and leave another 1024 bits to carry authentication data.
4. Encrypt the embedded bit string using any useful encryption technique (16), such as the DES encryption standard promoted by the National Institute of Standards, which uses a private-key algorithm to encrypt the data. Greater security may be obtained using the RSA public-key encryption technique, a patented method in which different keys are used for encryption and decryption (see U.S. Pat. No. 4,405,829). If desired after encryption, append to the string to be embedded a bit string indicating the encryption technique employed. For more secure applications, this last step should not be done.
5. Calculate and append an error correction code to the bit string to be embedded (18). Any suitable technique for producing the error correction code ("ECC") may be used, such as a Single Error Correcting, Double Error Correcting code ("SECDED") which uses 8 bits for every 64 bits of data.
6. Embed the resulting bit string into the data block (20). For encoding on arbitrary streams, the bit string should be spread out across the block as much as possible. In some circumstances, a mathematical function for layout might be employed that creates a pseudo-random distribution of the bits from the bit string, making it difficult to retrieve the string without intimate knowledge of the function used for embedding. For example, in a SMPTE 259M stream, the least significant bit of a series of luminance values might be modified according to a regular pattern, such as the ratio of the number of bits to be embedded to the number of luminance values. In a large image, this might mean modifying only one of every 50 values, which would make the changes invisible to a viewer of the image.

If the format of the underlying stream is not of importance, and an arbitrary embedding process is chosen, then there is a likelihood that the embedding process can obscure formatting information within the stream. This means that the stream cannot be passed to hardware or software that decodes the stream without first recovering the original stream.

Retrieval Process

Figure 2:
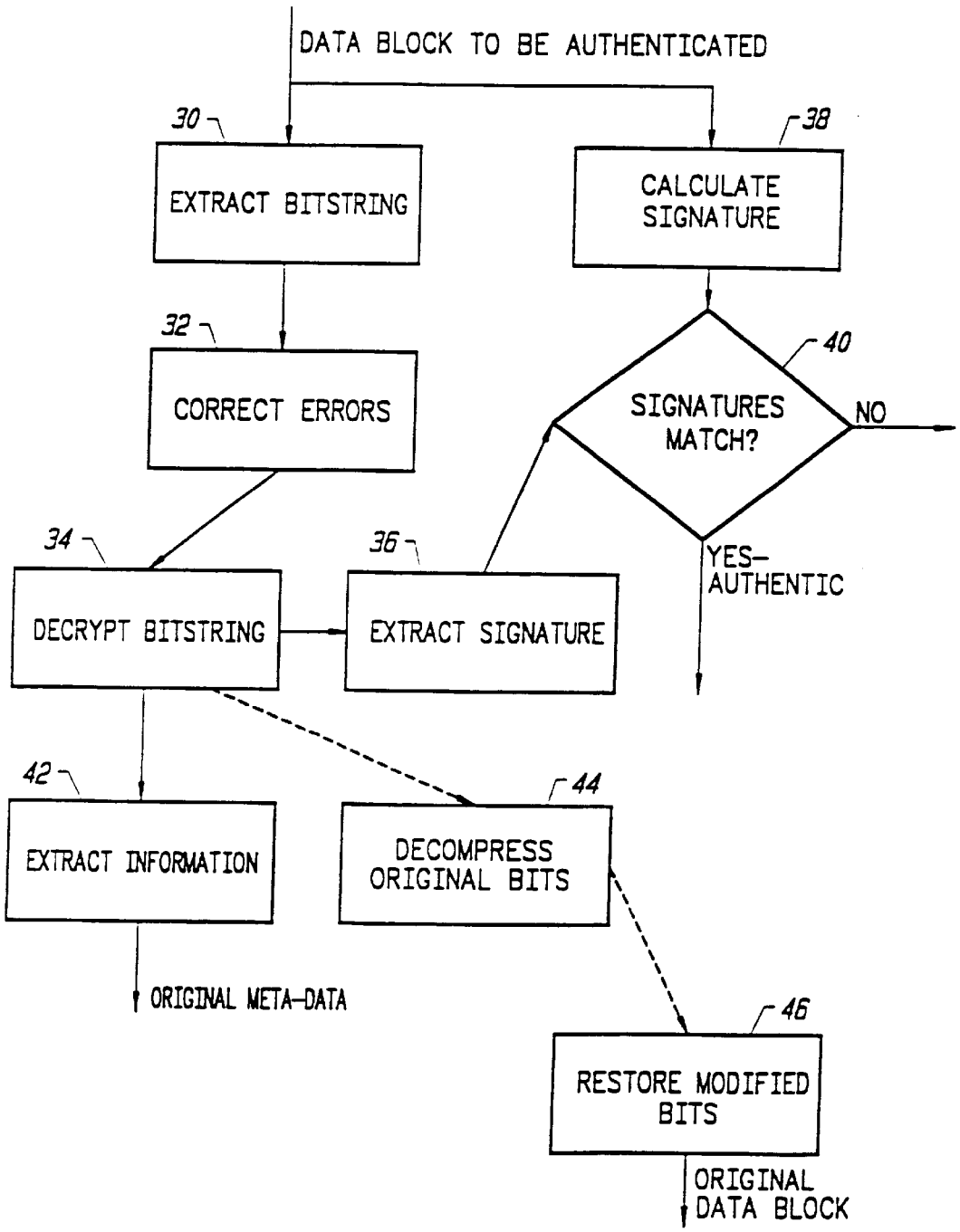
FIG. 2 is a flow diagram of a retrieval sequence according to the invention.

The retrieval process is shown in FIG. 2. In this case, the control process presents a data block to the retrieval process along with information including the expected error correction code, encryption algorithm, and embedding process used. The retrieval process returns a code indicating success or the type of failure, as well as the meta-data bit string originally passed in to the embedding process. The retrieval process also returns the data block to its original state if overlaid bits were included in a compressed form in the embedded data.

The steps of the retrieval process are:
1. The bit string that was embedded is retrieved from the bit stream using the inverse of the above described embedding technique (30). Because the data is embedded in-band, it is necessary to know the embedding technique used without reference to the original stream. The embedded bit string is produced as a result of this step. The data block is left unmodified. If all other steps succeed, then a final pass is made that returns the data block to its original form.
2. Use the Error Correction Code in the bit string to correct any errors that may have occurred (32).
3. Decrypt the bit string (34). If the less secure method of appending a field to the bit string indicating the encryption technique was used, then decrypt with that method. Otherwise, the decryption method must be known ahead of time.
4. Extract the digital signature from the bit string (36). Calculate the digital signature (38) on the supposedly original data block after setting all modified bits to a specific value. If the signatures are not the same (40), then the original image or the embedded bit string has been tampered with. As with the decryption step, if the signature type was appended to the bit string, extract it and use the information to decide which signature algorithm to apply. Otherwise, the signature technique must be known in advance.
5. Decompress the unmodified bits (44) and restore the block (optional). Extract the compressed representation of the unmodified bits of the original block (42), decompress them, and restore those bits to the data block (46).

Marking JPEG Images

The JPEG coding algorithm is based in part on the fact that small segments of an image are generally similar to nearby segments. Thus, portions of the image can be compressed by taking advantage of this redundancy. This is done by converting the information in an image from the spatial domain into the frequency domain, thereby generating a set of frequency coefficients. Similar portions of the image are now represented by runs of zero coefficients in the frequency domain. These zero coefficients may be further compressed by converting the coefficients into a run-length pair, each pair indicating a number of zero coefficients and the amplitude of a non-zero coefficient. These pairs are then coded with a variable length code, using shorter codes for commonly occurring pairs and longer codes for less common pairs (Huffman encoding).

A JPEG image may be permanently marked by modifying the least significant bit of a number of the variable length codes in the image. The codes to be modified may be chosen in a number of ways, such as the first N codes in each compressed image, or the number of codes in an image divided by the N bits to be embedded. Thus, it is possible to mark the image using the process described herein, such that the marking can be recovered and verified to be accurate.

A digital signature may be calculated by dividing the image into a number of fixed size blocks, e.g. 2048-byte blocks. For each block, a 32-bit CRC code is calculated. If the compressed image occupies 50 kbytes of storage, then the calculation results in 25 blocks. If the signature is created by concatenating the CRC codes, then an 800-bit signature is generated.

As an example of marking an image using the invention herein, assume the following:

1) A 196-bit identification key (the meta-data) that includes information such as the creator of the image and the final licensee;
2) An 800-bit digital signature; and
3) A 128-bit ECC code.

This is a total of 1124 bits of information. Assume the use of Lempel-Ziv compression to achieve a 2:1 compression ratio of the original bits from the image. This adds an additional 562 bits of data to be embedded, which means that it is also necessary to store the compressed version of those bits, or another 281 bits, and so on. This means that 2247 bits of information must be embedded in the image. It is also possible to define a block of data to be embedded, e.g. 2500 bits, and always use that size. This would leave a reasonable amount of room for variations in the compression ratio achieved, or for additional authentication data.

To achieve an additional level of error correction, each bit can be embedded in triplicate in the image, modifying a total of 6741 bits. On retrieval, each triplet is extracted, and the resultant bit assumes whatever value at least two of the extracted bits have in common. This provides a much higher degree of error correction than the embedded ECC code alone. Out of a 50 kbyte image, this means modifying less than 1.6% of the image, while providing for complete reconstruction of the original image.

Marking an MPEG Digital Movie

The MPEG 1 standard specifies a method of encoding based on estimated motion between video frames. A group of pictures ("GOP") is a sequence of frames (no more than sixteen) that are encoded together. The first frame is always compressed using the JPEG algorithm for a single image. Following that, a number of calculations are made to extract information about motion between frames. Information about changes between frames is usually much more compact than simply sending succeeding frames, leading to the high compression rates achieved. For this example, assume that the basic block of the invention is an MPEG GOP. For simplicity, this description assumes that only the initial frame of each GOP is to be marked for authentication.

The meta-data to be encoded in each block is the sequence number of the GOP in the overall sequence of the movie. The authentication information is embedded within the frame beginning a GOP using the JPEG technique described above.

On retrieval, the decoder looks for an increasing sequence number after retrieving the meta-data. If the sequence numbers are not proper, then the stream has been tampered with.

Hardware Encoding

Figure 3:
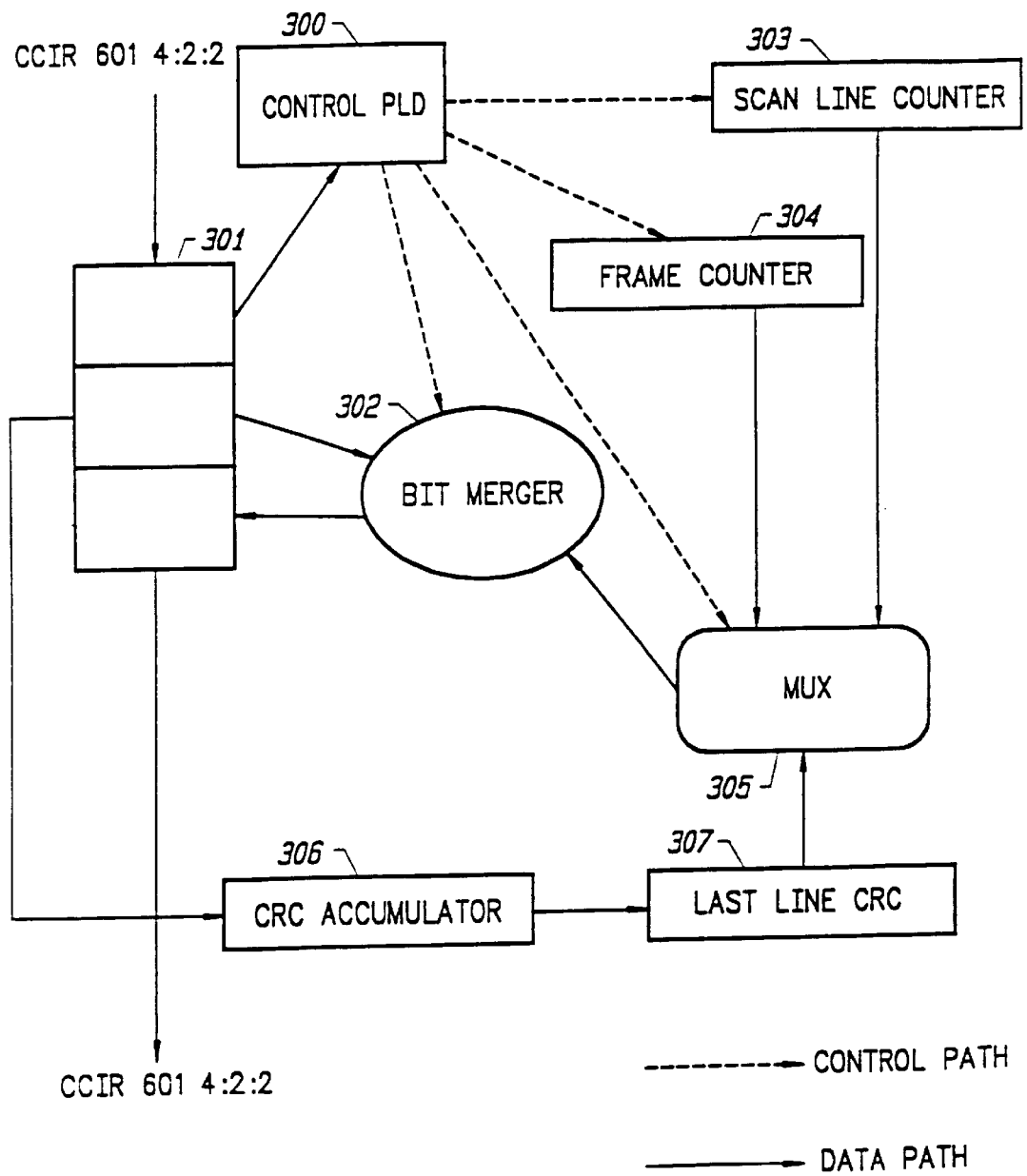
FIG. 3 is a block schematic diagram of an authentication apparatus according to the invention.

It will be apparent to those skilled in the art that this embodiment of the invention can be implemented as a software program operating on a general purpose computer or microprocessor. However, it is often desirable to implement the encoding and/or decoding step in a dedicated hardware element. FIG. 3 is a block schematic diagram of an integrated circuit that can be used to embed a sequence number in a series of video frames.

Preferably, the circuit shown in FIG. 3 is implemented in an integrated circuit that can process digital video data in real-time, i.e. accept an original video stream and produce a marked video stream. The circuit accepts digital video in a stream of bytes as specified by the CCIR 601 (D1) standard for digital video, in a 4:2:2 format, and produces an equivalent stream including embedded authentication information.

In this format, the image is organized as a sequence of frames, and each frame is organized as a sequence of scan lines, i.e. rows of pixels across the screen. If the video is in the NTSC format, then there are 525 lines in each frame, each of which contains the information for about 656 pixels, encoded as 3 bytes to every two pixels, or 984 bytes per line. In this embodiment of the invention, each frame is marked with a 32-bit sequence number.

In an alternate embodiment of the invention relative to the block schematic diagram of FIG. 3, each scan line is treated as a data block. Thus, each scan line is marked with a sequence number. Additionally, instead of marking the first scan line with the scan line sequence number, the first scan line is instead marked with a frame sequence number. The sequence number for each scan line is marked on the succeeding scan line, with the sequence number for the final scan line being discarded.

In this embodiment of the invention, instead of calculating a separate error correction code, the error correction process forms a portion of the embedding/retrieval process. First, for each scan line the circuit calculates a 32-bit CRC value for the digital signature. Each bit of the signature is encoded into the least significant bit of the luminance (Y) component of three pixels in sequence. On extraction, these three bits are compared, and the extracted bit is formed as a match of two or more bits among the three. Accordingly, 96 pixels must be modified. These pixels are modified beginning with the first three pixels in the scan line, then another three every 30 pixels.

FIG. 3 shows the control path signal lines as dotted arrows. Data path lines are shown as solid arrows. The control path of this design is implemented in a programmable logic device ("PLD") (300). The PLD is coupled to control two counters: a frame sequence counter (304) and a scan line sequence counter (303). A simple accumulator with CRC logic (306) is used to calculate the CRC code, which is cleared at the beginning of every scan line. A simple multiplexor (305) allows selection of the scan line number or frame number as the bit pattern to be embedded in the block.

A data input port is coupled to provide the input data of the digital block to a three stage pipeline (301). Upon receipt of each pixel, the first stage of the pipeline is coupled to provide the pixel to the PLD. The PLD recognizes the code that indicates the beginning of a scan line, and instructs the scan line counter to increment the scan line count. At that time, the PLD also instructs the CRC accumulator to send its results to the last CRC register (307). If the pixel received is recognized as the code that indicates the beginning of a new frame, the PLD instructs the bit merger to take the sequence number from the frame counter rather than the scan line counter.

As each pixel passes through the pipeline, the scan line or frame sequence number is prepended to the last CRC value, which is merged with the pixel stream by the bit merger (302) using the technique described above, except that the bits are merged starting at a fixed offset after the scan line begins, protecting the pixel code that indicates the beginning of a scan line or frame. Finally, each pixel is coupled to the output of the circuit at the third stage of the pipeline, producing a CCIR 601 compliant bit stream.

It should be appreciated that the foregoing applications of the invention were provided for purposes of example and to teach the preferred embodiment known at this time. The invention may be used to embed any kind of data, including covert data.

While most prior art is concerned with analog systems, the invention is concerned strictly with digital embedding. In the analog information art, an analogous technique is referred to as modulating a signal. Covert analog data are used to modulate a transmitted signal at a very low rate (i.e.

change over seconds or more). Such modulated data are very hard to detect, but can pass a reasonable amount of information over so-called covert channels. The dual of this technique in the digital domain is the novel embedding technique herein described, which allows a small amount of data to be embedded into a data block by modifying a small number of bits among very many.

With regard to digital embedding techniques, the prior art is primarily concerned with either full-scale encryption or error-free delivery. Thus, the invention may be described generally as:

1. Deliberately introducing errors into a digital data block to embed information into the block. The information may be any sequence of bits that encode knowledge of interest to the receiver of the data block, such as the authentication information discussed above.
2. By careful choice of where the errors are introduced into the data block, the errors may be made unnoticeable to the casual observer when the data is converted into non-digital forms. These choices depend on the underlying format and purpose of the data block.
3. With proper knowledge of the error inducing technique, the embedded information can be retrieved on demand.
4. A compressed representation of the modified portions of the data block may be contained within the embedded information, in which case the original data block can be recovered by decompressing the representation and placing the correct bits into position within the block.
5. In all cases, any additional errors introduced into the digital data block after the embedding process are detected, whether these errors have been deliberately introduced or through failures in the underlying transmission or storage systems.
6. When appropriate algorithms are used, it is possible to protect the Information by either encrypting it or including error correcting information within it, or both.
7. The embedded information may include encoding that indicate the encryption technique used.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

What is claimed is:

1. A method for embedding information into a digital data block, comprising the steps of:
   a) providing a digital data block having a basic format;
   b) providing a bit string of information for encoding knowledge of interest to a receiver of said digital data block; and
   c) processing said digital data block and said bit string by both a data embedding step and an encryption step to provide a modified digital data block having said bit string embedded and encrypted therein, said data embedding step being performed in a manner so as not to change said basic format of said digital data block and so that said bit string is not readily noticeable when said modified digital data block is converted into a non-digital form.

2. The method of claim 1, wherein said bit string of information comprises a bit string of information relating to said digital data block.

3. The method of claim 2, wherein said bit string of information includes meta-data about said digital data block.

4. The method of claim 2, wherein said bit string of information includes a digital signature for said digital data block.

5. The method of claim 4, wherein said digital signature is generated based upon said digital data block.

6. The method of claim 4, wherein said digital signature is calculated according to a predetermined digital signature calculation technique, and wherein said method further includes the step of appending digital data indicative of said predetermined digital signature calculation technique to said bit string of information.

7. The method of claim 1, wherein said encryption step is performed according to a predetermined encryption technique, and wherein said method further includes the step of appending digital data indicative of said predetermined encryption technique to said bit string of information.

8. The method of claim 1, wherein said step of processing further includes an error correction step to provide an error correctable bit string which is embedded and encrypted in said digital data block.

9. The method of claim 8, wherein said error correction step comprises calculating an error correction code for said bit string for correcting a possible error, and appending said error correction code to said bit string.

10. The method of claim 1, further including the step of compressing said digital data block.

11. The method of claim 1, further including the step of compressing said bit string of information.

12. The method of claim 1, wherein portions of said digital data block are modified during said embedding step, and wherein said method further includes the steps of compressing said portions of said digital data block that are to be modified during said embedding step to provide a compressed representation of said portions, and appending said compressed representation to said bit string.

13. The method of claim 12, further comprising the step of recovering said digital data block after said step of processing, said step of recovering comprising extracting said compressed representation from said modified digital data block; decompressing said compressed representation extracted from said modified digital data block; and replacing the portions of said modified digital data block that were modified during said embedding step with said decompressed representation.

14. The method of claim 1, wherein said bit string includes at least one of restoration information and authentication information, and wherein said method further includes the steps of retrieving said bit string from said modified digital data block, and performing at least one of a restoring step and an authentication step on said modified digital data block in accordance with said retrieved bit string.

15. The method of claim 1, wherein said step of processing comprises performing said encryption step prior to said embedding step.

16. The method of claim 1, wherein said embedding step comprises embedding said bit string in a pseudo-random distribution fashion.

17. The method of claim 1, wherein said digital data block is based upon audio digital data which is representative of an audio object.

18. The method of claim 1, wherein said digital data block is based upon image digital data which is representative of an image.

19. A method for embedding information into a digital data block, comprising the steps of:
   a) providing a digital data block;
   b) providing a bit string of information for encoding knowledge of interest to a receiver of said digital data block;

c) encrypting said bit string of information to provide an encrypted bit string; and d) embedding said encrypted bit string in said digital data block, said step of embedding being performed in a manner so that said encrypted bit string is not readily noticeable when said digital data block is converted into a non-digital form.

20. The method of claim 19, wherein said bit string of information comprises a bit string of information relating to said digital data block.

21. The method of claim 20, wherein said bit string of information includes meta-data about said digital data block.

22. The method of claim 20, wherein said bit string of information includes a digital signature for said digital data block.

23. The method of claim 22, further including the step of compressing said digital signature prior to said step of encrypting.

24. The method of claim 22, wherein said digital signature is generated based upon said digital data block.

25. The method of claim 22, wherein said digital signature is calculated according to a predetermined digital signature calculation technique, and wherein said method further includes the step of appending digital data indicative of said predetermined digital signature calculation technique to said bit string of information.

26. The method of claim 19, wherein said step of encrypting said bit string is performed according to a predetermined encryption technique, and wherein said method further includes the step of appending digital data indicative of said predetermined encryption technique to said bit string of information.

27. The method of claim 19, further including an error correction step to provide an error correctable bit string, said error correction step being performed prior to said embedding step.

28. The method of claim 27, wherein said error correction step comprises calculating an error correction code for said bit string for correcting a possible error, and appending said error correction code to said bit string.

29. The method of claim 19, further including the step of compressing said digital data block.

30. The method of claim 29, wherein said digital data block is a JPEG compression.

31. The method of claim 29, wherein said digital data block is a MPEG compression.

32. The method of claim 19, further including the step of compressing said bit string of information.

33. The method of claim 19, further comprising the step of compressing said bit string prior to said step of encrypting said bit string.

34. The method of claim 19, wherein portions of said digital data block are modified during said embedding step, and wherein said method further includes the steps of compressing said portions of said digital data block that are to be modified during said embedding step to provide a compressed representation of said portions, and appending said compressed representation to said bit string.

35. The method of claim 34, further comprising the step of recovering said digital data block after said embedding step, said step of recovering comprising extracting said compressed representation from said modified digital data block; decompressing said compressed representation extracted from said modified digital data block; and replacing the portions of said modified digital data block that were modified during said embedding step with said decompressed representation.

36. The method of claim 19, wherein said bit string includes at least one of restoration information and authentication information, and wherein said method further includes the steps of retrieving said bit string from said modified digital data block, and performing at least one of a restoring step and an authentication step on said modified digital data block in accordance with said retrieved bit string.

37. The method of claim 19, wherein said embedding step comprises embedding said bit string in a pseudo-random distribution fashion.

38. The method of claim 19, wherein said digital data block is based upon audio digital data which is representative of an audio object.

39. The method of claim 19, wherein said digital data block is based upon image digital data which is representative of an image.

40. The method of claim 39, wherein said image digital data is based upon a photographic image.

41. The method of claim 39, wherein said image digital data is based upon a video image.

42. The method of claim 39, wherein said image digital data is provided by one of a camera, a video recorder, and a cable converter.

43. A method for determining a match of digital information representative of knowledge of interest for a digital data block, comprising the steps of:

a) providing a digital data block having a basic format;

b) providing a first bit string of digital information for encoding knowledge of interest to a receiver of said digital data block;

c) embedding said first bit string of digital information in said digital data block according to a predetermined embedding process to provide a modified digital data block having said first bit string embedded therein, said step of embedding being performed in a manner so as not to change said basic format of said digital data block and so that said bit string is not readily noticeable when said modified digital data block is converted into a non-digital form;

d) providing a second bit string of digital information representative of said first bit string of digital information;

e) extracting said first bit string of digital information from said modified digital data block by using an inverse of said predetermined embedding process; and f) comparing said first bit string of digital information to said second bit string of digital information for identifying a match of said first and second bit strings of digital information.

44. The method of claim 43, wherein said first bit string of digital information comprises a first digital signature representative of a characteristic of said digital data block; and wherein said second bit string of digital information comprises a second digital signature representative of the same characteristics of said digital data block as said first digital signature.

45. The method of claim 44, wherein said first digital signature is generated based on said digital data block, and wherein said step of providing said second digital signature comprises generating said second digital signature based on said modified digital data block after said first digital signature has been extracted therefrom.

46. The method of claim 45, wherein said first digital signature is calculated according to a predetermined digital signature calculation technique; wherein said step of providing said first digital signature includes appending digital data indicative of said predetermined digital signature calculation technique to said first digital signature; wherein said step of embedding includes embedding said first digital signature and said appended digital data indicative of said predetermined digital signature calculation technique in said digital data block; and wherein said step of extracting includes separately retrieving said first digital signature and said digital data indicative of said digital signature calculation technique.

47. The method of claim 46, wherein said step of generating said second digital signature includes calculating said second digital signature according to said predetermined digital signature calculation technique.

48. The method of claim 44, further including the step of authenticating said digital data block if said first digital signature matches said second digital signature.

49. The method of claim 48, wherein said digital data block comprises compressed digital data, and wherein said method further includes the step of decompressing said compressed digital data after said step of authenticating said digital data block.

50. The method of claim 43, further including the step of encrypting said first bit string of digital information according to a predetermined encryption process to provide an encrypted first bit string prior to said step of embedding; wherein said step of embedding comprises an embedding said encrypted first bit string; and wherein said step of extracting comprises first de-embedding said modified digital data block using said inverse of said predetermined embedding process, retrieving said encrypted first bit string after said de-embedding step, and decrypting said retrieved encrypted first bit string.

51. The method of claim 50, further including the step of appending digital data indicative of said predetermined encryption process to said first bit string of digital information prior to said step of embedding; wherein said step of retrieving includes separately retrieving said encrypted first bit string and said digital data indicative of said predetermined encryption process; and wherein said step of decrypting is performed based on said retrieved digital data indicative of said predetermined encryption process.

52. The method of claim 43, further including the steps of calculating an error correction code for said first bit string of digital information for correcting a possible error, and appending said error correction code to said first bit string prior to said step of embedding; wherein said step of embedding includes embedding said first bit string and said appended error correction code in said digital data block; and wherein said step of extracting includes extracting said first bit string and said error correction code from said modified digital data block, separately retrieving said first bit string and said error correction code, and using said retrieved error correction code to correct any errors in said retrieved first bit string of digital information.

53. The method of claim 43, wherein said first bit string includes authentication information for authenticating said digital data block.

54. The method of claim 53, wherein said authentication information comprises at least one or more of a serial number, an identification tag, an authentication tag, and a digital signature.

55. The method of claim 43, wherein said authentication information includes copy authentication information.

56. The method of claim 43, further including the step of appending meta-data about said digital data block to said first bit string of digital information prior to said step of embedding; wherein said step of embedding includes embedding said first bit string and said appended meta-data in said digital data block; and wherein said step of extracting includes extracting said first bit string and said appended meta-data, and separately retrieving said first bit string and said meta-data.

57. The method of claim 43, wherein portions of said digital data block are modified when said first bit string of digital information is embedded during said embedding step; wherein said step of providing said first bit string of digital information includes compressing said portions of said digital data block to provide a compressed representation of said portions, and appending said compressed representation to said first bit string prior to said step of embedding; and wherein said step of embedding includes embedding said first bit string and said appended compressed representation in said digital data block.

58. The method of claim 57, wherein said step of extracting includes extracting said first bit string and said compressed representation from said modified digital data block, and separately retrieving said first bit string and said compressed representation; and wherein said method further includes the steps of decompressing said compressed representation extracted from said modified digital data block to provide a decompressed representation, and replacing the portions of said digital data block that were modified during said embedding step with said decompressed representation if said first bit string matches said second bit string.

59. The method of claim 43, wherein said digital data block comprises compressed digital representation data; and wherein said method further includes the step of decompressing said compressed digital representation data if said first bit string of digital information matches said second bit string of digital information.

60. The method of claim 43, wherein said first bit string is embedded in a pseudo-random distribution fashion.

61. The method of claim 43, wherein said digital data block is based upon audio digital data which is representative of an audio object.

62. The method of claim 43, wherein said digital data block is based upon image digital data which is representative of an image.

63. A method for determining a match of digital information representing a digital data block, comprising the steps of:

a) providing a digital data block having a basic format;

b) providing a first bit string of information for encoding knowledge of interest to a receiver of said digital data block;

c) embedding said first bit string of information in said digital data block according to a predetermined embedding process to provide a modified digital data block having said first bit string embedded therein, said step of embedding being performed in a manner so as not to change said basic format of said digital data block and so that said first bit string is not readily noticeable when said modified digital data block is converted into a non-digital form;

d) extracting said first bit string of information from said modified digital data block by using an inverse of said predetermined embedding process;

e) generating a second bit string of information based upon said digital data block; and f) comparing said first bit string of information to said second bit string of information for identifying a match of said two bit strings of information.

64. The method of claim 63, wherein said first bit string of information comprises a first digital signature representative of a characteristic of said digital data block; and wherein said second bit string of information comprises a second digital signature representative of the same characteristics of said digital data block as said first digital signature.

65. The method of claim 64, wherein said first digital signature is generated based on said digital data block, and wherein said step of generating said second digital signature comprises generating said second digital signature based on said modified digital data block after said first digital signature has been extracted therefrom.

66. The method of claim 65, wherein said first digital signature is calculated according to a predetermined digital signature calculation technique; wherein said step of providing said first digital signature includes appending digital data indicative of said predetermined digital signature calculation technique to said first digital signature; wherein said step of embedding includes embedding said first digital signature and said appended digital data indicative of said predetermined digital signature calculation technique in said digital data block; and wherein said step of extracting includes separately retrieving said first digital signature and said digital data indicative of said digital signature calculation technique.

67. The method of claim 66, wherein said step of generating said second digital signature includes calculating said second digital signature according to said predetermined digital signature calculation technique.

68. The method of claim 64, further including the step of authenticating said digital data block if said first digital signature matches said second digital signature.

69. The method of claim 68, wherein said digital data block comprises compressed digital data, and wherein said method further includes the step of decompressing said compressed digital data after said step of authenticating said digital data block.

70. The method of claim 63, further including the step of encrypting said first bit string of digital information according to a predetermined encryption process to provide an encrypted first bit string prior to said step of embedding; wherein said step of embedding comprises an embedding said encrypted first bit string; and wherein said step of extracting comprises first de-embedding said modified digital data block using said inverse of said predetermined embedding process, retrieving said encrypted first bit string after said de-embedding step, and decrypting said retrieved encrypted first bit string.

71. The method of claim 70, further including the step of appending digital data indicative of said predetermined encryption process to said first bit string of digital information prior to said step of embedding; wherein said step of retrieving includes separately retrieving said encrypted first bit string and said digital data indicative of said predetermined encryption process; and wherein said step of decrypting is performed based on said retrieved digital data indicative of said predetermined encryption process.

72. The method of claim 63, further including the steps of calculating an error correction code for said first bit string of information for correcting a possible error, and appending said error correction code to said first bit string prior to said step of embedding; wherein said step of embedding includes embedding said first bit string and said appended error correction code in said digital data block; and wherein said step of extracting includes extracting said first bit string and said error correction code from said modified digital data block, separately retrieving said first bit string and said error correction code, and using said retrieved error correction code to correct any errors in said retrieved first bit string of digital information.

73. The method of claim 63, wherein said first bit string includes authentication information for authenticating said digital data block.

74. The method of claim 73, wherein said authentication information comprises at least one or more of a serial number, an identification tag, an authentication tag, and a digital signature.

75. The method of claim 73, wherein said authentication information includes copy authentication information.

76. The method of claim 63, further including the step of appending meta-data about said digital data block to said first bit string of information prior to said step of embedding; wherein said step of embedding includes embedding said first bit string and said appended meta-data in said digital data block; and wherein said step of extracting includes extracting said first bit string and said appended meta-data, and separately retrieving said first bit string and said meta-data.

77. The method of claim 63, wherein portions of said digital data block are modified when said first bit string of information is embedded during said embedding step; wherein said step of providing said first bit string of information includes compressing said portions of said digital data block to provide a compressed representation of said portions, and appending said compressed representation to said first bit string prior to said step of embedding; and wherein said step of embedding includes embedding said first bit string and said appended compressed representation in said digital data block.

78. The method of claim 77, wherein said step of extracting includes extracting said first bit string and said compressed representation from said modified digital data block, and separately retrieving said first bit string and said compressed representation; and wherein said method further includes the steps of decompressing said compressed representation extracted from said modified digital data block to provide a decompressed representation, and replacing the portions of said digital data block that were modified during said embedding step with said decompressed representation if said first bit string matches said second bit string.

79. The method of claim 63, wherein said digital data block comprises compressed digital representation data; and wherein said method further includes the step of decompressing said compressed digital representation data if said first bit string of information matches said second bit string of information.

80. The method of claim 63, wherein said first bit string is embedded in a pseudo-random distribution fashion.

81. The method of claim 63, wherein said digital data block is based upon audio digital data which is representative of an audio object.

82. The method of claim 63, wherein said digital data block is based upon image digital data which is representative of an image.

* * * * *